United States Patent
Grimandi et al.

(10) Patent No.: US 11,845,617 B2
(45) Date of Patent: Dec. 19, 2023

(54) CONVEYING METHOD AND SYSTEM FOR A MACHINE TO FILL BOTTLES, IN PARTICULAR IN THE PHARMACEUTICAL INDUSTRY

(71) Applicant: G.D SOCIETA' PER AZIONI, Bologna (IT)

(72) Inventors: Andrea Grimandi, Bologna (IT); Luca Testoni, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 101 days.

(21) Appl. No.: 17/610,140

(22) PCT Filed: May 22, 2020

(86) PCT No.: PCT/IB2020/054892
§ 371 (c)(1),
(2) Date: Nov. 9, 2021

(87) PCT Pub. No.: WO2020/240381
PCT Pub. Date: Dec. 3, 2020

(65) Prior Publication Data
US 2022/0219910 A1   Jul. 14, 2022

(30) Foreign Application Priority Data
May 24, 2019   (IT) .................. 102019000007193

(51) Int. Cl.
*B65G 47/244*   (2006.01)
*B65B 43/46*   (2006.01)
(Continued)

(52) U.S. Cl.
CPC ............. *B65G 47/244* (2013.01); *B65B 43/46* (2013.01); *B65B 43/50* (2013.01); *B65B 43/62* (2013.01);
(Continued)

(58) Field of Classification Search
CPC .......... B65G 2201/0247; B65G 51/035; B65G 47/244; B65G 47/842; B65G 47/847;
(Continued)

(56) References Cited

U.S. PATENT DOCUMENTS 907,116 A * 12/1908 Baker .................. B65G 47/846
198/479.1
2,198,594 A   4/1940 Mundy
(Continued)

FOREIGN PATENT DOCUMENTS

CN   1140693 A   1/1997
CN   1456481 A   11/2003
(Continued)

OTHER PUBLICATIONS

International Search Report and Written Opinion for corresponding International Application No. PCT/IB2020/054892, dated Sep. 15, 2020.
(Continued)

*Primary Examiner* — James R Bidwell (57) ABSTRACT

A conveying method and system for a machine to fill bottles, with a non-circular cross-section, in particular for products in the pharmaceutical industry; the following are provided: a plurality of holding members designed to hold a plurality of bottles in a suspended position; movers to move the plurality of holding members along a processing path; and guides, which are arranged parallel to the processing path, allow the bottles to move only when the bottles are arranged according to a predetermined orientation, and force the
(Continued)

bottles to assume and maintain the predetermined orientation.

7 Claims, 7 Drawing Sheets

(51) Int. Cl.
    *B65B 43/50*     (2006.01)
    *B65B 43/62*     (2006.01)
    *B65G 21/20*     (2006.01)

(52) U.S. Cl.
    CPC .. *B65G 21/2072* (2013.01); *B65G 2201/0247* (2013.01)

(58) Field of Classification Search
    CPC ........................ B65G 54/02; B65G 21/2063; B65G 21/2072; B65B 43/46; B65B 43/50; B65B 43/52
    USPC ...................................................... 198/470.1
    See application file for complete search history.

(56) References Cited

U.S. PATENT DOCUMENTS

| | | | | |
|---|---|---|---|---|
| 3,930,574 | A * | 1/1976 | Iwata | B65G 47/244 198/373 |
| 4,124,112 | A * | 11/1978 | Mohney | B65G 47/847 198/479.1 |
| 5,743,377 | A | 4/1998 | Kronseder | |
| 6,901,721 | B2 | 6/2005 | Spatafora | |
| 7,007,793 | B2 * | 3/2006 | Stocchi | B65G 47/846 198/803.11 |
| 9,499,353 | B2 * | 11/2016 | Fahldieck | B67B 3/02 |
| 9,643,791 | B2 | 5/2017 | Landler et al. | |
| 2015/0353297 | A1 * | 12/2015 | Fahldieck | B65G 47/847 141/129 |

FOREIGN PATENT DOCUMENTS

| | | | |
|---|---|---|---|
| CN | 101389553 A | 3/2009 | |
| CN | 105050924 A | 11/2015 | |
| CN | 205151090 U | 4/2016 | |
| CN | 107042985 A | 8/2017 | |
| CN | 206375373 U | 8/2017 | |
| CN | 109641703 A | 4/2019 | |
| DE | 102013106084 A1 | 12/2014 | |
| GB | 2077684 A | 12/1981 | |
| GB | 2126185 A | 3/1984 | |
| GB | 2490505 A | 11/2012 | |
| JP | 2004175503 A | 6/2004 | |
| WO | WO-2010/072858 A1 | 7/2010 | |
| WO | WO-2012/130973 A1 | 10/2012 | |
| WO | 2015/018564 | * 2/2015 | ........... B65G 47/244 |

OTHER PUBLICATIONS

Italian Priority Search Report and Opinion for Corresponding Italian Application No. 102019000007193, dated Feb. 24, 2020.
European Patent Application No. 20742878.0, Communication Pursuant to Article 94(3) EPC, dated Apr. 12, 2023.

* cited by examiner

CONVEYING METHOD AND SYSTEM FOR A MACHINE TO FILL BOTTLES, IN PARTICULAR IN THE PHARMACEUTICAL INDUSTRY

CROSS-REFERENCE TO RELATED APPLICATIONS

This patent application is a U.S. national phase of International Patent Application No. PCT/IB2020/054892 filed May 22, 2020, which claims the benefit of priority from Italian patent application no. 102019000007193 filed on May 24, 2019, the respective disclosures of which are each incorporated herein by reference in their entireties.

TECHNICAL FIELD

The present invention relates to a conveying method and system for a machine to fill bottles (i.e. bottles, small bottles, flasks, or other types of containers), having a non-circular cross-section.

The present invention is advantageously applied to a machine to fill bottles for products in the pharmaceutical industry to which the following disclosure will make explicit reference without thereby losing its generality.

BACKGROUND ART

A known machine to fill bottles for pharmaceutical products comprises, for example, a conveying system which moves a succession of bottles through a weighing station for empty bottles, through a filling station in which a predetermined quantity of liquid or powder product is fed into each bottle, through a weighing station for filled bottles, through a capping station in which each bottle is provided with a respective cap, and finally through a labelling station in which at least one label is applied onto each bottle.

In a filling machine like the one described above, some of the transfers of the bottles from one processing station to the next, as well as the handling of the bottles along some processing stations takes place by means of holding members (typically pliers or forks), which carry the bottles suspended, by grabbing them at the neck, and are connected to handling means (typically they are mounted on a conveyor) designed to move the holding members and therefore the bottles.

In the parts of the movement system thus created, the bottles, not having a real support, may undergo rotations and/or inclinations during the feeding due to the vibrations generated by the movement (especially when the movement is a step movement and therefore subject the bottles to a continuous alternation of accelerations and decelerations). This can be a problem in particular when the filling machine processes bottles having a non-circular cross-section, for example elongated (i.e. non-symmetrical cross-section, with a larger size along a main development axis and a smaller size along a secondary development axis orthogonal to the main development axis) and when at least one processing station of the filling machine requires a particular orientation of the bottle. For example, the capping station and the labelling station require, when used for bottles having a non-circular cross-section, that the bottles arrive at the stations oriented in a same predetermined manner; in fact, only in this way the capping will be carried out after an optimal elimination of the air incorporated in the bottles and the label will be applied on the more extended part of the side wall of the bottle. Therefore, an involuntary rotation of the bottle, for example due to the vibrations generated by the movement when entering the capping station or the labelling station would compromise the operation of expelling the air from the bottle before applying the cap, in the case of the capping station, and would entail an incorrect positioning of the label, in the case of a labelling station, making the bottles in the worst cases unusable and therefore to be discarded.

The patent application WO2010072858A1 describes a conveying system for the transport of bottles suspended under the pressure of air jets.

The patent application GB2126185 describes a conveying system for carrying, by giving a uniform orientation, circular disks which support bottles having a non-circular cross-section.

The U.S. Pat. No. 2,198,594 describes a conveying system for carrying, by giving a uniform orientation, containers having a non-circular cross-section.

DISCLOSURE OF INVENTION

The object of the present invention is to provide a bottle conveying method and a system in a machine to fill bottles, in particular for products in the pharmaceutical industry, which guarantee the correct orientation of the bottles during the transport thereof, so as to avoid the drawbacks mentioned above and that are simple and inexpensive to implement.

According to the present invention, a bottle conveying method and system in a machine to fill bottles are provided, in particular for products in the pharmaceutical industry, according to what is claimed in the attached claims.

The claims describe embodiments of the present invention forming an integral part of the present description.

BRIEF DESCRIPTION OF THE DRAWINGS

The present invention will now be described with reference to the attached drawings, which illustrate some non-limiting examples of embodiments, wherein.

BEST MODE FOR CARRYING OUT THE INVENTION

In the attached figures, number 1 denotes as a whole a bottle (bottle, small bottle, flask) for example a single-use one (i.e. disposable which is therefore used only once and then replaced) of a known type, in particular to contain a product 2 of the pharmaceutical industry (typically in liquid or powder form). The bottle 1 is closed by means of a cap 3 which is applied to the neck 4 of the bottle 1; the bottle 1 is also provided with a label 6 glued to an external surface of the bottle 1. The bottle 1 illustrated in the attached figures has a non-circular cross-section, in particular elongated; in other words, the cross-section of the bottle 1 has a larger size along a main axis X and a smaller size, which is smaller than the larger size, along a secondary axis Y perpendicular to the main axis X (as clearly illustrated in FIGS. 2-7). In the embodiment illustrated in the attached figures, the transverse section of the bottle 1 has a substantially elliptical shape with the larger side walls flattened (i.e. flat).

As illustrated in FIGS. 2-7, a machine to fill bottles 1 for products 2 of the pharmaceutical industry of the type described above generally comprises, at least on some parts of its processing path, a conveying system 7 which comprises a plurality of holding members 8, typically formed by pliers or forks, designed to grab the neck 4 of the bottles 1 so as to hold the bottles 1 in a suspended position while moving along a processing path (i.e. from one processing station to another, or inside a given processing station), represented by an arrow in FIGS. 2 to 7. In particular, the holding members 8 are mounted in a cantilever manner on a conveyor 9, which is linear in FIGS. 8 and 9 and is rotary (i.e. a carousel) in FIG. 10, and which can be operated when in movement by operating means (not illustrated) of a known type so as to move the holding members 8 mounted thereon, and therefore the bottles 1, along the processing path.

The conveying system 7 object of the invention comprises, furthermore, guide means 10 arranged parallel to the processing path, as schematically illustrated in FIGS. 2 to 7; which guide means 10 are arranged to allow the movement of each bottle 1 along the processing path only when the bottle 1 is oriented according to a predetermined orientation, that is, with reference to the attached figures, when the bottle 1 is oriented with its secondary development axis Y substantially perpendicular to the processing path and therefore with its main development axis X parallel to the processing path. The guide means 10 are further designed to act upon those bottles 1 that arrive to the entrance of the conveying system 7 oriented in a different way with respect to the predetermined orientation so as to induce the same to assume said predetermined orientation.

Figure 10:
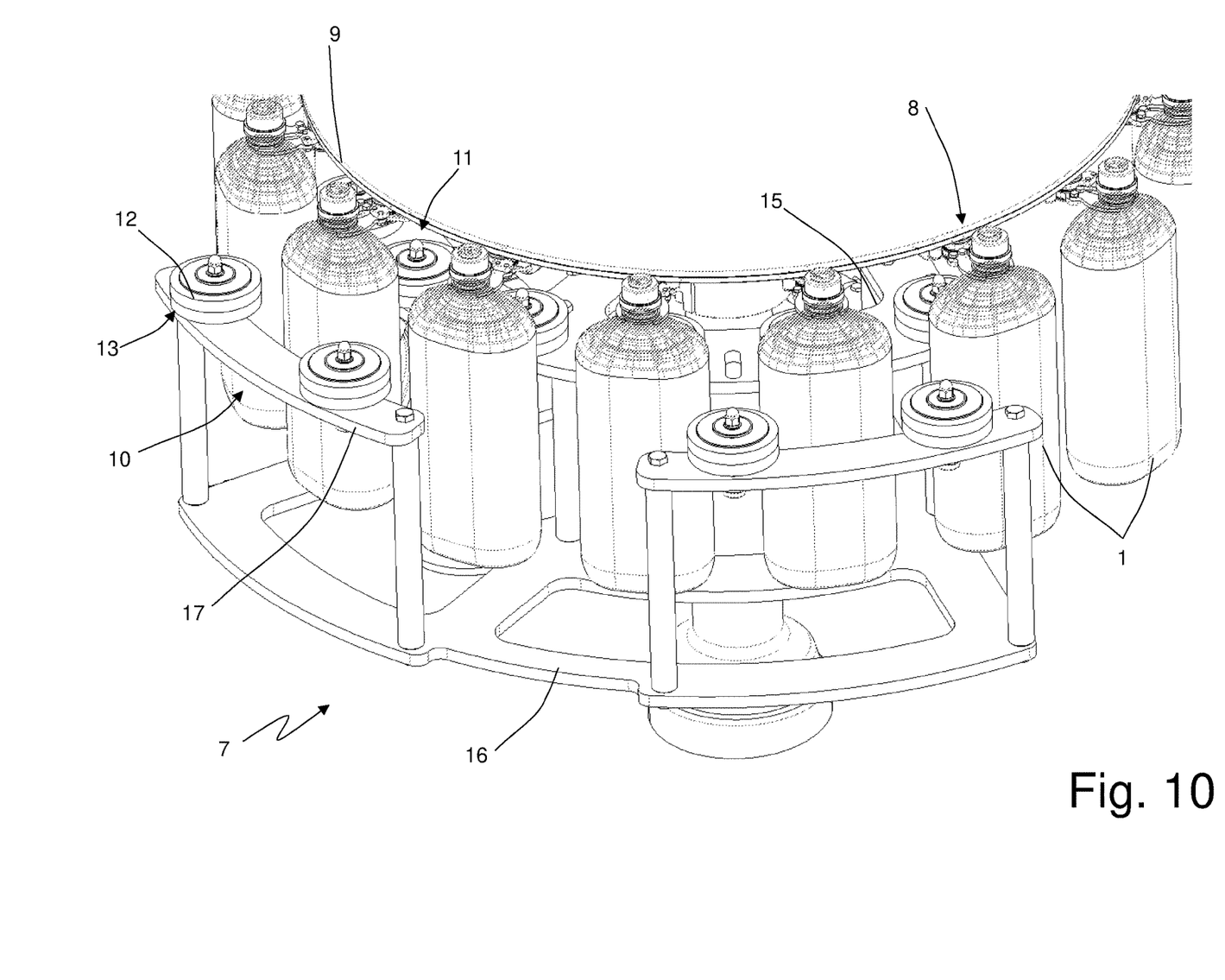
FIG. 10 is a perspective view of a part of the conveying system of the invention made according to the embodiment schematically illustrated in FIGS. 2 to 5.

In particular, according to a first embodiment illustrated in FIGS. 2 to 5 and in FIG. 10, the illustrated guide means 10 comprise a plurality 11 of idle rollers 12 arranged beside one another along one side of the processing path and a further plurality 13 of idle rollers 12 arranged beside one another along the other side of the processing path so as to define a passage channel 14 for the bottles 1, along which the bottles 1 can move only if oriented according to the predetermined orientation described above. The passage channel 14 has, in fact, a width which is substantially equal (taking into account normal tolerances) to the smaller size of each bottle 1; in other words, as illustrated in FIGS. 2 to 5, the pluralities 11 and 13 of idle rollers 12 are arranged spaced apart from one another by a distance which is at least equal to the smaller size of the bottles 1 and which is, in any case, sufficiently smaller than the larger size of the bottles 1 so as to make impossible for a bottle 1, that is not oriented with the main development axis X parallel to the processing path, to pass through the passage channel 14.

Furthermore, the idle rollers 12 are arranged and shaped so as to ensure that if a bottle 1, oriented according to an orientation other than the predetermined orientation arrives at the entrance of the passage channel 14, said bottle 1 comes into contact at least with one of the idle rollers 12 and is pushed by the idle roller 12 itself until it assumes the predetermined orientation. In said regard, the idle rollers 12 arranged anteriorly with respect to the processing path (i.e. arranged upstream of the processing path, i.e. at the entrance section of the passage channel 14) are shaped to define (by means of their external wall) an invitation section for the passage channel 14 inclined (i.e. flared) towards the outside, so that also the bottles 1 that arrive to this entrance section oriented according to an orientation different from the predetermined one (see FIG. 4) come into contact with this inclined invitation section, i.e. with the external wall of one of the aforementioned idle rollers 12, which will transmit to the bottle 1 a push such as to induce the bottle 1 itself, bound in the translations by the action of the holding members 8, to rotate around the its longitudinal axis Z (illustrated in FIG. 1) until orienting itself according to the predetermined orientation.

In said regard, according to a preferred embodiment of the present invention, the holding members 8 are arranged to grab the neck 4 of the bottles 1 so as to hold the bottles 1 safely, i.e. so as to prevent the translations of the bottles 1, allowing, at the same time, the bottles 1 to rotate around their longitudinal axis Z; in this way the bottles 1 that arrive to the entrance of the passage channel 14 oriented according to an orientation different than the predetermined one, can (suitably urged by the idle rollers 12) rotate around their axis Z until assuming the predetermined orientation.

Moreover, to further improve the efficiency of the conveying system 7 in terms of the ability to straighten (i.e. to orient according to the predetermined orientation) the bottles 1 entering the passage channel 14, the pluralities 11 and 13 of idle rollers 12 can be arranged so as to ensure that the bottles 1 arriving at the passage channel 14 oriented in a different way than the predetermined orientation are subjected to pushing actions on both sides of the passage channel 14. In other words, the idle rollers 12 (i.e. at least the idle rollers 12 arranged anteriorly with respect to the processing path) are arranged so as to ensure that each bottle 1 that must be straightened (i.e. that must be oriented according to the predetermined orientation) first comes into contact with the outer wall of the idle roller 12 arranged on one side of the passage channel 14, which will exert a first push on the bottle 1 to correct the orientation thereof, as explained above, and then with the outer wall of the idle roller 12 arranged on the other side of the passage channel 14, that will exert a second push directed in the opposite direction from the first, so as to ensure (even if the first push was not sufficient) that the bottle 1 straightens (i.e. it is arranged according to the predetermined orientation). In this regard, the idle rollers 12 could for example be arranged on the two opposite sides of the passage channel 14 offset from one another, as illustrated in FIG. 10.

With particular reference to FIG. 10, the holding members 8 are carried in a cantilever manner by the carousel-type conveyor 9. The plurality 11 of idle rollers 12 is carried by an arch-shaped beam 15 which has a smaller diameter than that of the conveyor 9, is arranged internally with respect to the holding members 8, and is carried by a frame 16 mounted on the conveyor 9; the other plurality 13 of idle rollers 12 is carried by a plurality of arch-shaped beams 17 which are arranged externally with respect to the holding members 8 and develop along a circumference having a diameter greater than that of the conveyor 9. In detail, the idle rollers 12 are carried by the beams 15 and 17 so as to be protruding towards the inside of the passage channel 14, in order to ensure that the bottles 1 passing through the passage channel 14 come into contact with the idle rollers 12 and are guided by said idle rollers 12 during movement, without sliding or bumping against the beams 15 and 17.

With particular reference to FIGS. 6 to 9, the guide means 10 comprise a plurality of idle rollers 12 arranged beside one another along one side of the processing path and a fixed side board 18 arranged on the other side of the processing path so that a passage channel 14 for the bottles 1 is defined between the idle rollers 12 and the fixed side board 18, along which the bottles 1 can move only if oriented according to the predetermined orientation described above. In this case as well, the passage channel 14 has, in fact, a width which is substantially equal (taking into account normal tolerances) to the smaller size of each bottle 1; in other words, the plurality of idle rollers 12 and the fixed side board 18 are spaced apart from one another by a distance which is at least equal to the smaller size of each bottle 1 and which is, in any case, sufficiently smaller than the larger size of the bottles 1 to make it impossible for a bottle 1, which is not oriented with the main development axis X parallel to the processing path (i.e. the plurality of idle rollers 12 and the fixed side board 18), to pass through the passage channel 14. Further, in analogy to what has been stated above for the first embodiment, the idle rollers 12 are arranged and shaped so as to ensure that if a bottle 1 oriented in an orientation different from the predetermined orientation arrives at the entrance of the passage channel 14, this bottle 1 comes into contact with at least one of the idle rollers 12 and is pushed by the idle roller 12 until it assumes the predetermined orientation. In this regard, the idle roller 12 arranged anteriorly with respect to the processing path is shaped so as to define an invitation section of the passage channel 14 inclined (i.e. flared) towards the outside, so that the bottles 1 that reach said section of invitation oriented according to an orientation different from the predetermined one (see FIG. 6) come into contact with the external wall of the idle roller 12, which will transmit to the bottle 1 a push such as to induce the bottle 1 itself, bound in the translations by the action of the holding members 8, to rotate around their longitudinal axis Z until oriented according to the predetermined orientation. Furthermore, the fixed side board 18 will be shaped so as to present a progressively increasing transversal portion 19 along the processing path before the processing path (i.e. upstream of the processing path, or at the entrance section of the processing path), so as to define together with the idle roller 12, arranged anteriorly with respect to the processing path, the above described inclined (or flared) invitation section of the passage channel 14.

In said regard, also in this case, preferably, the holding members 8 are arranged to grab the neck 4 of the bottles 1 so as to hold the bottles 1 safely, i.e. so as to prevent the translations of the bottles 1, allowing, at the same time, the bottles 1 to rotate around their longitudinal axis Z, in this way the bottles 1 that arrive to the entrance of the passage channel 14 oriented according to a different orientation from the predetermined one, can rotate around their axis Z until they assume the predetermined orientation.

Figure 1:
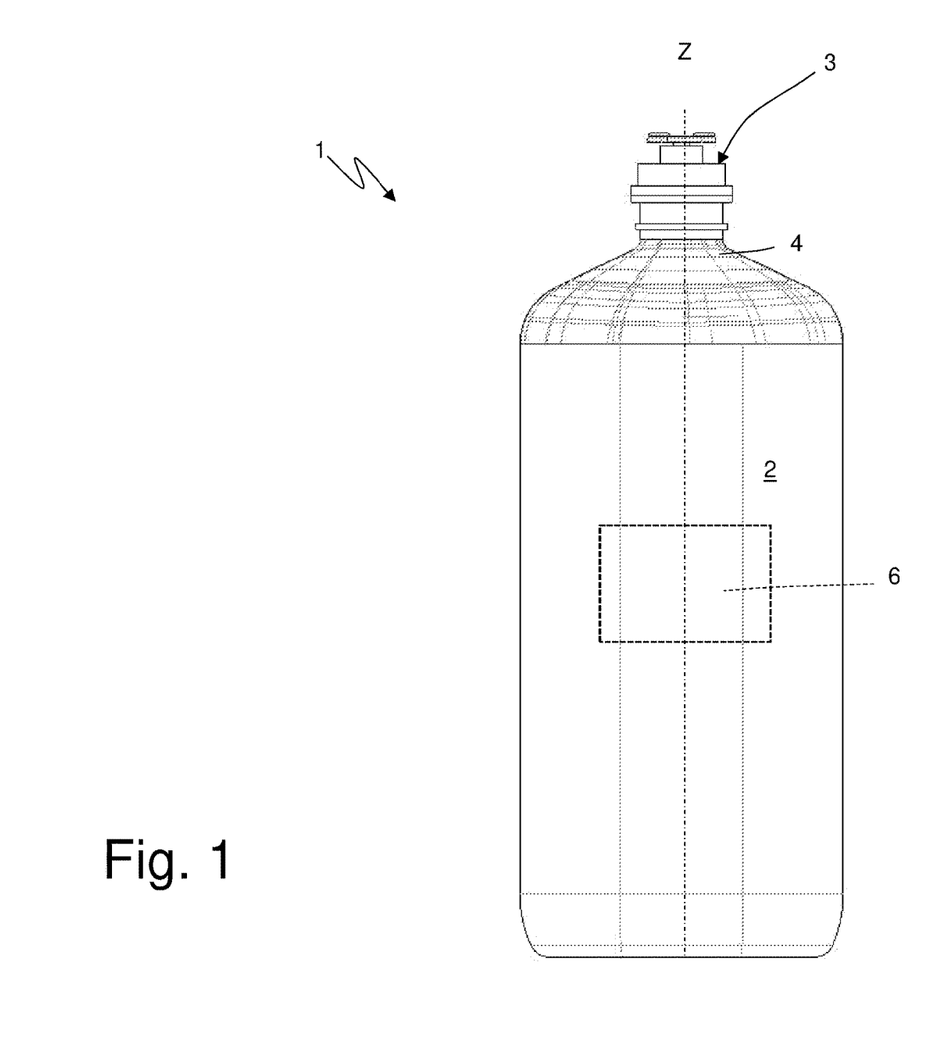
FIG. 1 is a schematic view of a bottle, in particular for products of the pharmaceutical industry.
Figure 2:
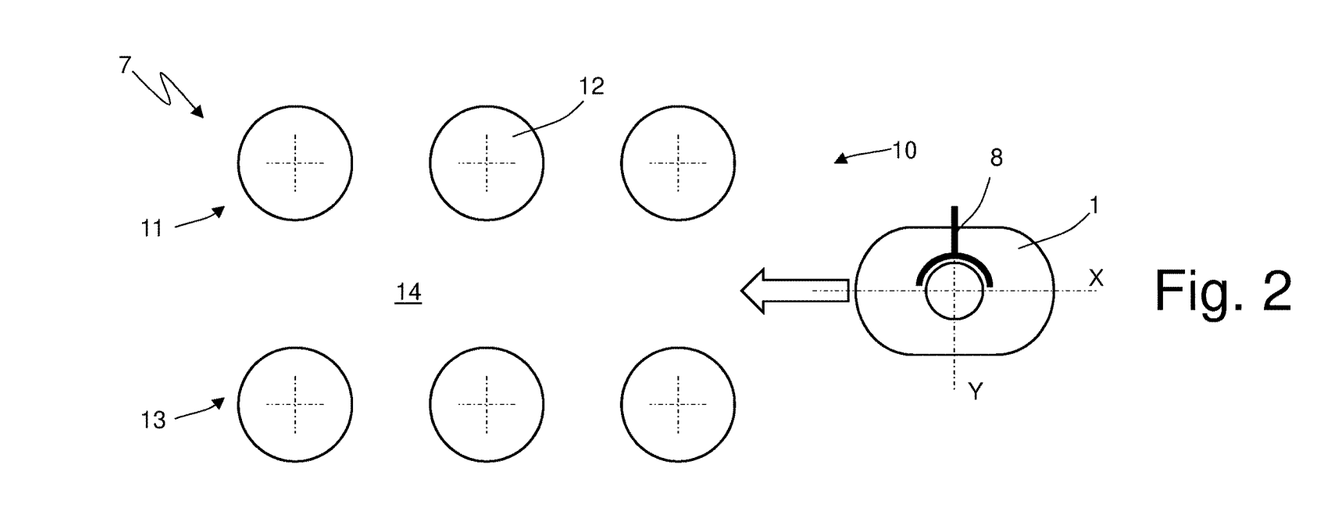
FIGS. 2 and 3 are schematic views of a part of a conveying system, made according to a first embodiment of the invention, and of a bottle during, respectively, the subsequent approach and passage steps of the bottle through the part of the conveying system in ideal conditions, in which the bottle arrives at the entrance of the conveying system oriented in the correct orientation.
Figure 3:
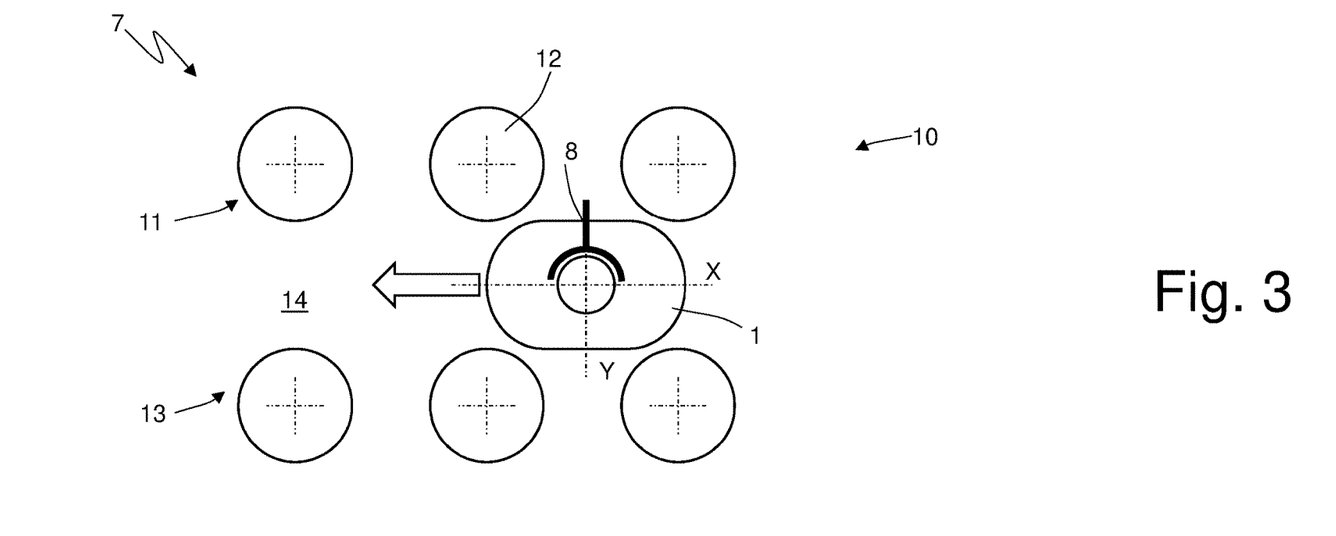
Figure 4:
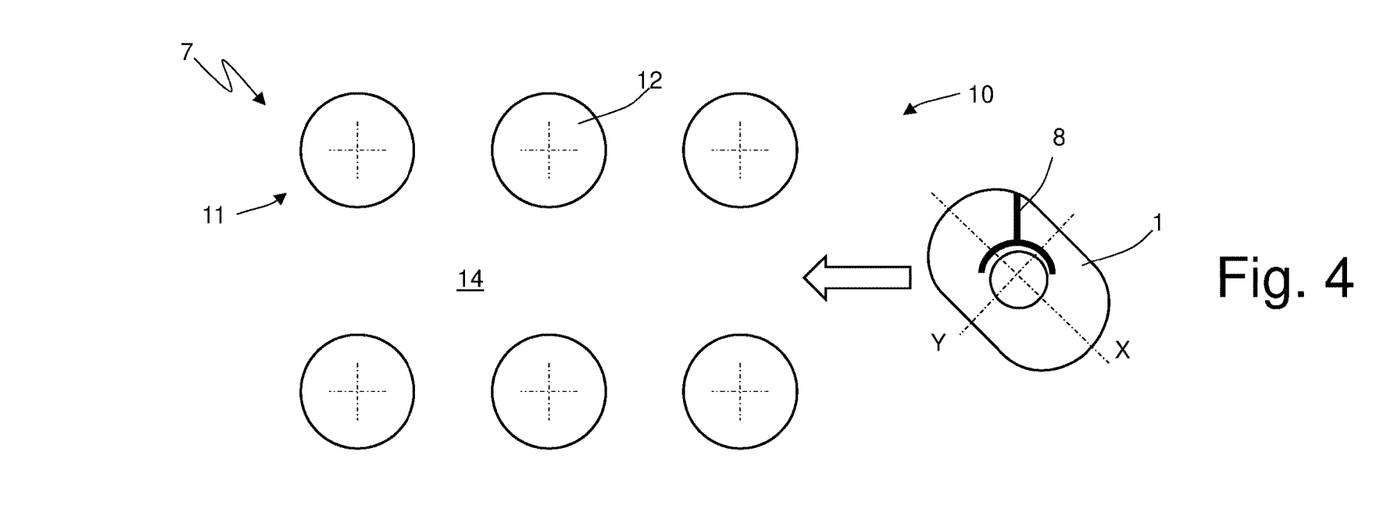
FIGS. 4 and 5 are schematic views similar to those of FIGS. 2 and 3 which represent a second possible scenario, in which the bottle arrives at the entrance of the conveying system oriented according to an orientation different from the correct orientation.
Figure 5:
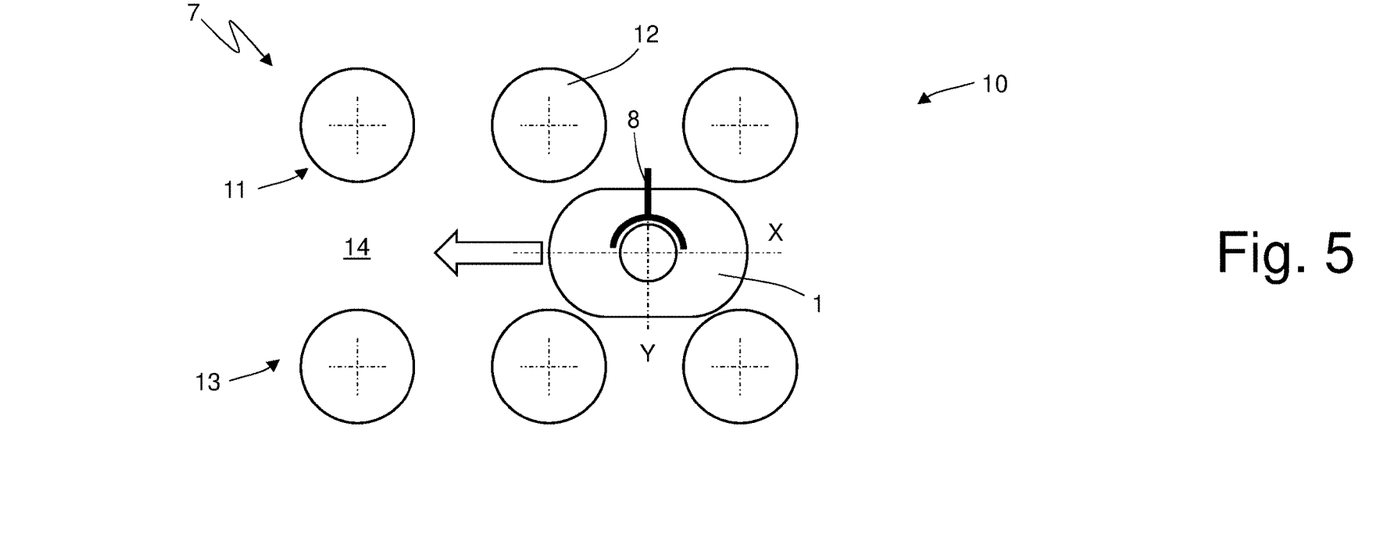
Figure 6:
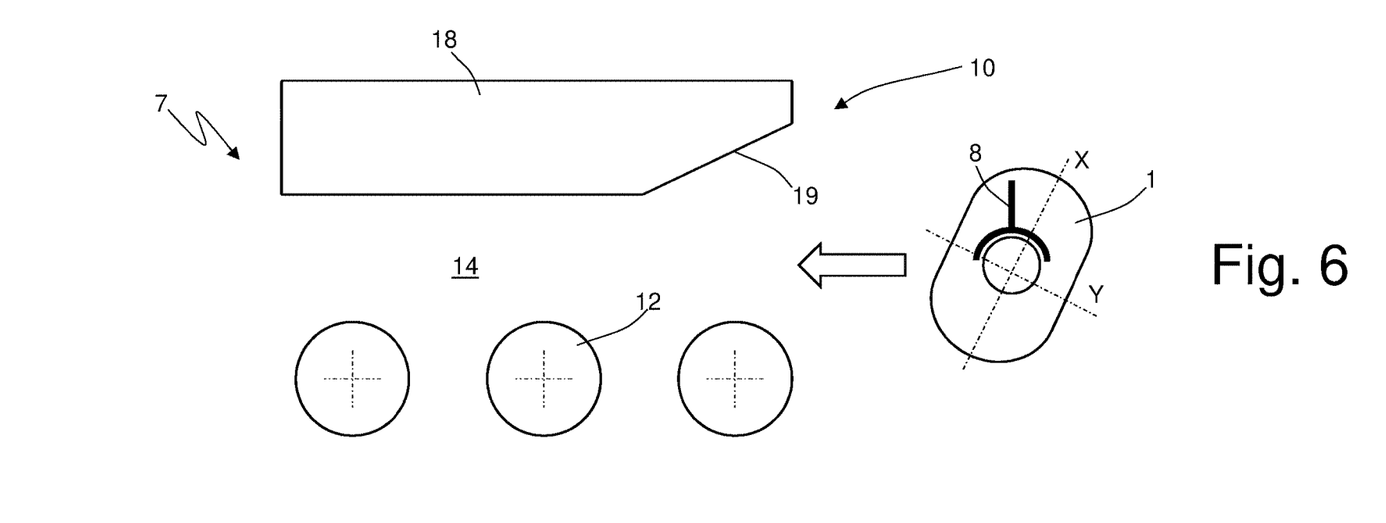
FIGS. 6 and 7 are schematic views of a part of the conveying system, made according to a second embodiment of the invention, and of a bottle during, respectively, the subsequent approach and passage steps of the bottle through the part of the conveying system, wherein a further possible scenario is represented in which the bottle arrives at the entrance of the conveying system oriented according to another orientation other than the correct orientation.
Figure 7:
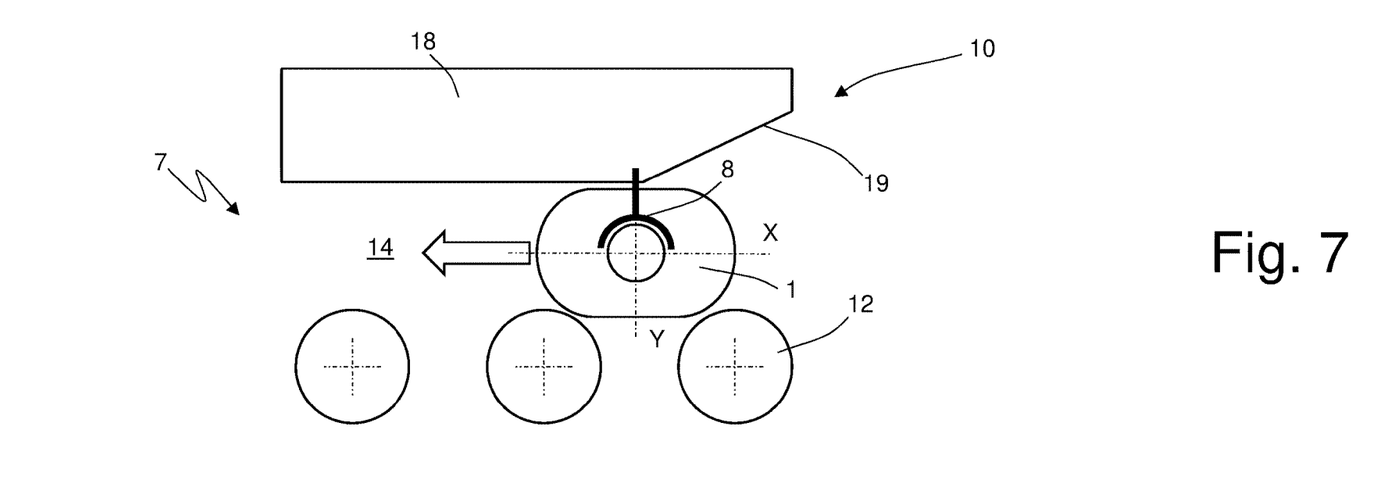
Figure 8:
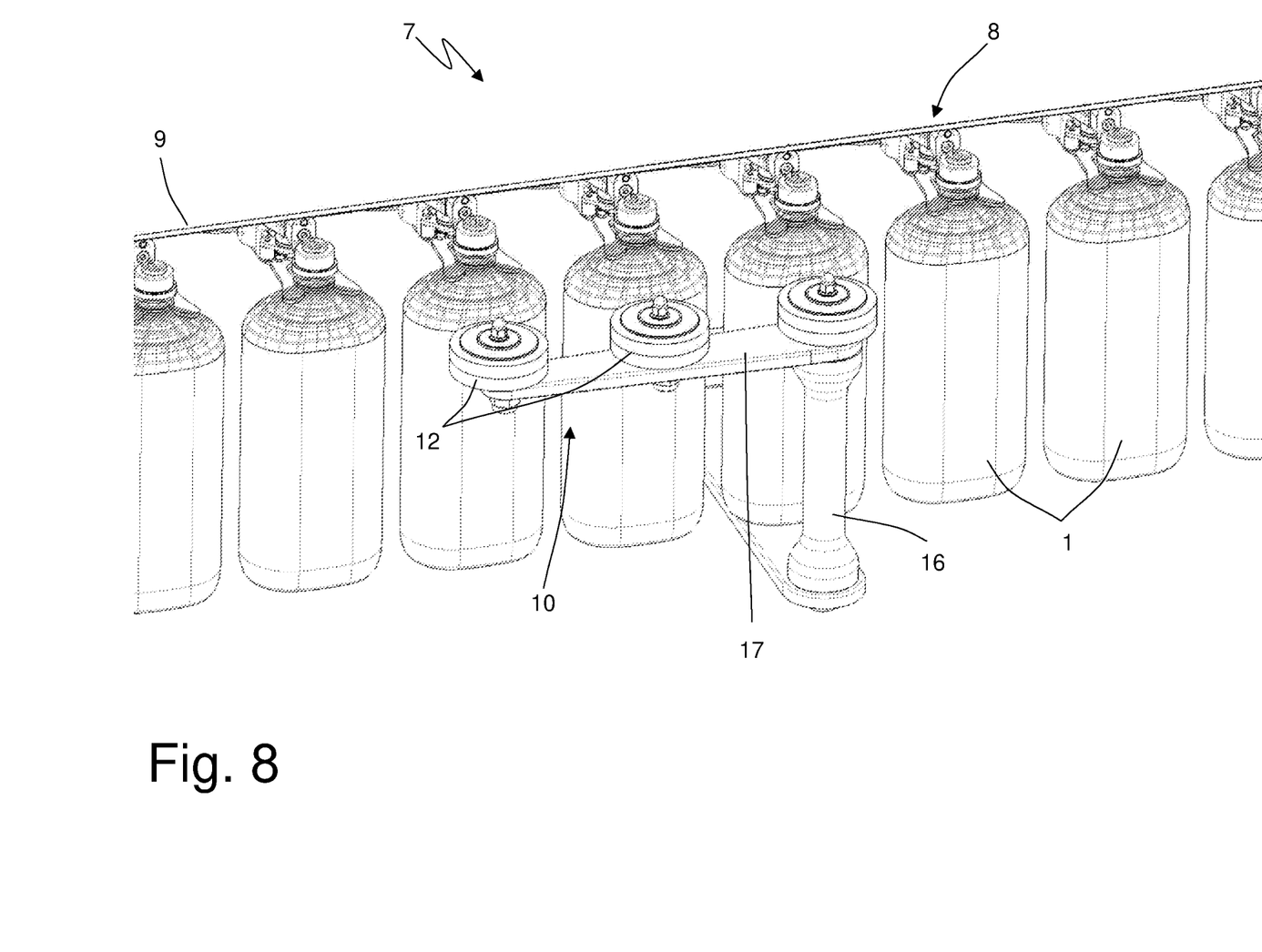
FIG. 8 is a perspective view of a part of the conveying system of the invention made according to the embodiment schematically illustrated in FIGS. 6 and 7.
Figure 9:
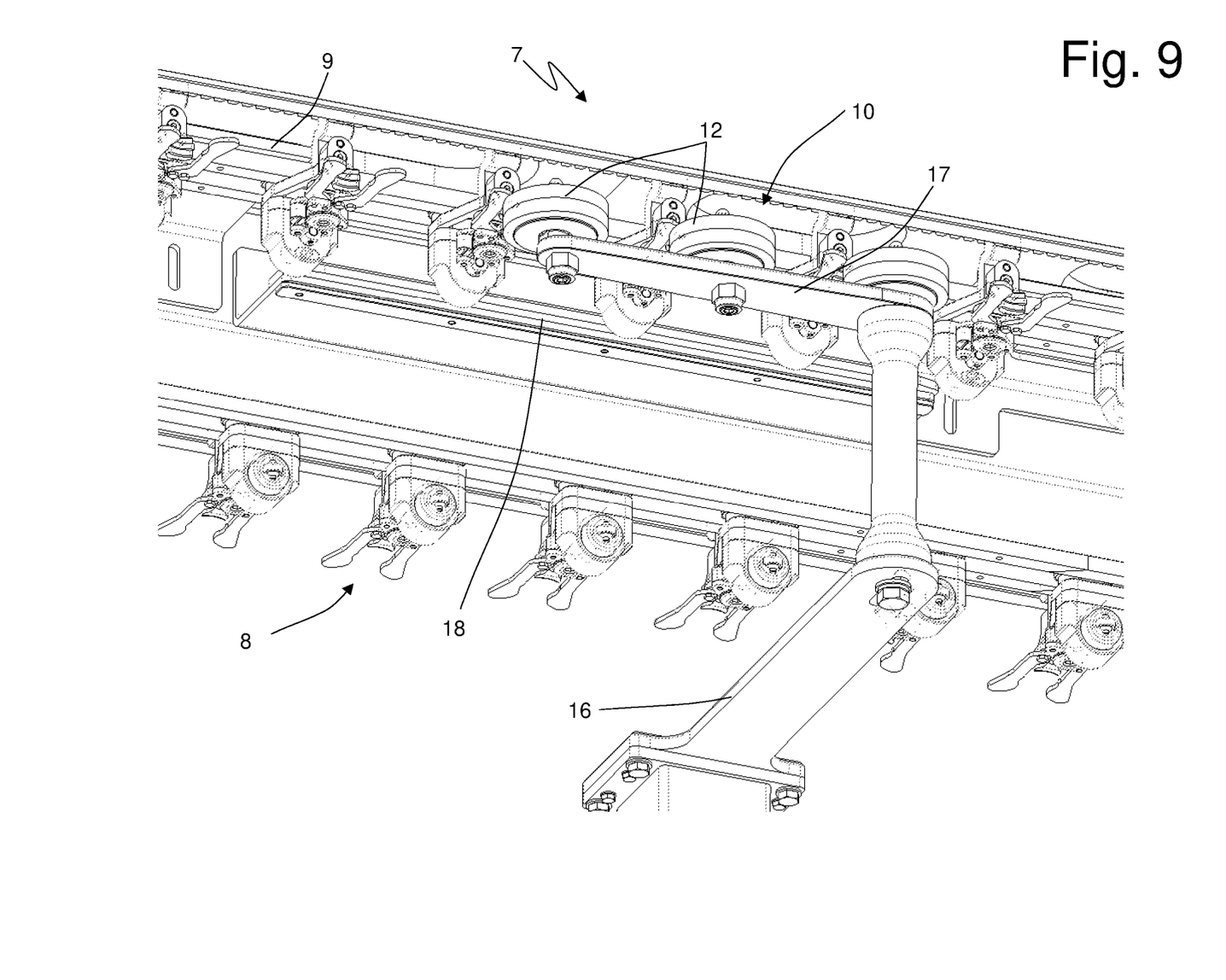
FIG. 9 is a perspective view of the part of the conveying system of FIG. 8 in which the bottles have been omitted for clarity.

Furthermore, with particular reference to the embodiment illustrated in FIGS. 8 and 9, the holding members 8 are carried in a cantilever manner along a straight processing path; the idle rollers 12 are carried by beams 17 parallel to the processing path, mounted on a frame 16, and arranged one after the other externally with respect to the holding members 8; and the fixed side board 18 is parallel to the processing path, is mounted on the frame 16 and is arranged internally with respect to the holding members 8. Also in this case the idle rollers 12 are mounted on the beams 17 so as to protrude towards the inside of the passage channel 14, in order to ensure that the bottles 1 passing through the passage channel 14 come into contact with the idle rollers 12 on one side and with the side board 18 fixed on the other side.

According to a further embodiment not illustrated, the guide means 10 could comprise a first fixed side board arranged on one side of the processing path and a second fixed side board arranged on the other side of the processing path so as to define a passage channel 14 for bottles 1, similar to the one described above with reference to the above mentioned embodiments of the invention. For example, the two fixed side boards could be made of a sufficiently smooth material to minimize the friction during the movement of the bottles 1 through the passage channel 14. These fixed side boards could also be shaped so as to provide a progressively increasing cross-section along the processing path before the processing path (i.e. upstream of the processing path, or at the entrance section of the processing path), in order to define an inclined (or flared) entrance section of the passage channel 14, shaped so as to ensure that the bottles 1 that arrive to the passage channel 14 arranged in a different orientation than the predetermined one are forced to assume the correct orientation.

According to a further embodiment not illustrated, the guide means 10 could comprise only and solely a guide body arranged on one side of the processing path, and said single guide body could be formed by a series of idle rollers 12, which act in a similar way to the idle rollers 12 of the embodiments described above, or by a fixed side board that acts in a similar way to the fixed side boards of the embodiments described above.

Moreover, according to a further alternative of the invention, the holding members 8 could be arranged to assume a loose configuration, so as to allow the rotation of the bottles 1 around the longitudinal axis Z when they move by means of guide means 10 as those described above, so as to allow said guide means 10 to straighten (i.e. to arrange according to the predetermined orientation) the bottles 1, when a holding member 8 crosses a passage channel 14 formed by the guide means 10 described above, and a tight configuration in which any movement of the bottles 1 with respect to the holding members 8 is prevented, when a holding member 8 is located outside the passage channel 14.

The embodiments described herein can be combined with each other without departing from the scope of the present invention.

It is understood that the bottles 1 could have a non-circular cross-section different from the elongated one mentioned above, for example they could have a rectangular section, or a rectangular section with rounded edges or any other shape that has a non-circular section.

It is also understood that the conveying system 7 object of the present invention could be used to convey any type of bottle 1 and/or small bottle and/or flask and/or container, for example bottles 1 for cosmetic products, for food products, for cleaning products etc.

Furthermore, it is evident that the idle rollers 12 described above could be replaced by any other rotating member, for example suitably shaped conveyor belts, idle cylinders, wheels, etc.

The conveying system 7 described above has numerous advantages.

Firstly, the conveying system 7 described above allows the bottles 1 to be straightened (i.e. arranged according to the predetermined orientation) and to be correctly oriented, consequently ensuring an optimal execution of those processes which require a predetermined orientation of the bottles 1, and reducing the risk of incorrect processing and therefore minimizing waste (i.e. defective bottles 1), with obvious advantages in terms of time and productivity costs.

Furthermore, thanks to the configuration of the guide means 10 at least anteriorly with respect to the processing path, the conveying system 7 of the invention ensures that the bottles 1 that arrive incorrectly oriented at the entrance of the conveying system 7 are pushed and oriented correctly during their advancement along at least the first part of the passage channel 14, without machine stops which would cause delays in the production cycle.

Furthermore, the conveying system 7 of the invention allows to carry out a more controlled transport of the bottles 1 ensuring, at the same transport speed, greater stability of the bottles 1 and, at the same time, ensuring that the bottles 1 are a lot less affected by the vibrations transmitted by the filling machine, since said vibrations will be at least partially absorbed by the guide systems 10 which hold the bottles 1 laterally while moving.

Finally, the conveying system 7 described above is relatively simple and inexpensive to implement, since compared to the known conveying systems, it has few additional elements which are easily mountable on known conveying systems and which are structurally simple, easy to find and inexpensive.

The invention claimed is:

1. A conveying method for a machine to fill bottles (1) having a non-circular cross-section; the cross-section of each bottle (1) has a larger size along a main axis (X) and a smaller size, which is smaller than the larger size, along a secondary axis (Y) perpendicular to the main axis; the conveying method comprising the steps of:
    engaging a plurality of bottles (1) by means of a plurality of corresponding holding members (8) designed to hold the bottles (1) in a suspended position;
    moving, by means of handling means, the plurality of holding members (8) carrying the bottles (1) in a suspended position along a processing path;
    allowing, by means of guide means (10) arranged parallel to the processing path, the bottles (1) to move only when the bottles (1) are arranged according to a predetermined orientation; and
    forcing, by means of the guide means (10) arranged parallel to the processing path, the bottles (1) to assume and maintain the predetermined orientation,
    wherein the guide means (10) comprise a plurality (11) of idle rollers (12) arranged beside one another on one side of the processing path and a fixed side board (18) arranged on the other side of the processing path, so that between the plurality (11) of idle rollers (12) and the fixed side board a channel for the passage of the bottles is defined.

2. The conveying method according to claim 1, wherein the holding members (8) are arranged to hold the bottles (1) allowing the bottles (1) to rotate around a longitudinal axis (Z) thereof arranged perpendicular to the processing path.

3. The conveying method according to claim 2, wherein each holding member (8) comprises pliers, which are designed to grab a neck (4) with a cylindrical shape of a corresponding bottle (1).

4. The conveying method according to claim 1, wherein a distance of the guide means (10) from a middle line of the processing path is equal to or greater than half of the smaller size and lesser than half the greater size.

5. The conveying method according to claim 1, wherein the guide means (10) have, at the front relative to the processing path, a cross-section (19) which progressively increases along the processing path.

6. The conveying method according to claim 1, wherein at least one idle roller (12) freely rotates around a rotation axis perpendicular to the processing path.

7. A conveying system (7) for a machine to fill bottles (1) with a non-circular cross-section; the cross-section of each bottle (1) having a larger size along a main axis (X) and a smaller size, which is lesser than the larger size, along a secondary axis (Y) perpendicular to the main axis; the conveying system (7) comprising:
    a plurality of holding members (8) designed to hold a plurality of bottles (1) in a suspended position;
    moving means to move the plurality of holding members (8) carrying the bottles (1) in a suspended position along a processing path; and
    guide means (10) which are arranged parallel to the processing path, allow the bottles (1) to move only when the bottles (1) are arranged according to a predetermined orientation, and force the bottles (1) to assume and maintain the predetermined orientation;
    wherein each holding member (8) comprises pliers, which are designed to grab a neck (4) with a cylindrical shape of a corresponding bottle (1); and
    wherein the guide means (10) comprise a plurality (11) of idle rollers (12) arranged beside one another on one side of the processing path and a fixed side board (18) arranged on the other side of the processing path, so that between the plurality (11) of idle rollers (12) and the fixed side board a channel for the passage of the bottles is defined.

* * * * *